(12) United States Patent
Yang et al.

(10) Patent No.: US 8,436,544 B2
(45) Date of Patent: May 7, 2013

(54) LED CONTROLLER WITH DE-FLICKER FUNCTION AND LED DE-FLICKER CIRCUIT AND METHOD THEREOF

(75) Inventors: Shei-Chie Yang, Wuri Township, Taichung County (TW); Shui-Mu Lin, Taichung (TW); Chuan-Yo Hsiao, Taipei (TW); Huan-Chien Yang, Yonghe (TW)

(73) Assignee: Richtek Technology Corporation, Hsin-Chu (TW)

( * ) Notice: Subject to any disclaimer, the term of this patent is extended or adjusted under 35 U.S.C. 154(b) by 440 days.

(21) Appl. No.: 12/927,281

(22) Filed: Nov. 10, 2010

(65) Prior Publication Data

US 2012/0013265 A1    Jan. 19, 2012

(30) Foreign Application Priority Data

Jul. 14, 2010   (TW) ................................ 99123150 A (51) Int. Cl.
*H05B 41/16*   (2006.01)
(52) U.S. Cl.
USPC ........................................................ 315/246

(58) Field of Classification Search .................. 315/291, 315/246, 307, 308, 311; 345/76, 77, 78, 345/84, 87, 97, 99, 204
See application file for complete search history.

(56) References Cited

U.S. PATENT DOCUMENTS

| 6,144,366 A * | 11/2000 | Numazaki et al. ............ 345/156 |
| 6,349,023 B1 * | 2/2002 | Greenberg ..................... 361/103 |
| 2008/0042953 A1 * | 2/2008 | De Haan et al. ................ 345/89 |

* cited by examiner

*Primary Examiner* — Minh D A
(74) *Attorney, Agent, or Firm* — Tung & Associates (57) ABSTRACT

The present invention discloses an LED controller with de-flicker function and an LED de-flicker circuit and method thereof. The LED controller includes: a duty ratio calculation circuit for receiving a pulse width modulation (PWM) signal and generating a duty input signal, indicating a digital duty ratio of the PWM signal; an LED de-flicker circuit for receiving the duty input signal and generating a duty output signal wherein a noise in the duty input signal is filtered; and a dimming circuit for receiving the duty output signal and generating a dimming signal to control an LED circuit; wherein the duty output signal remains unchanged when the variation of the duty input signal is not larger than a hysteresis threshold, and the duty output signal follows the duty input signal when the variation of the duty input signal is larger than the hysteresis threshold.

33 Claims, 7 Drawing Sheets

LED CONTROLLER WITH DE-FLICKER FUNCTION AND LED DE-FLICKER CIRCUIT AND METHOD THEREOF

BACKGROUND OF THE INVENTION

1. Field of Invention

The present invention relates to a light emitted diode (LED) controller with de-flicker function; particularly, it relates to an LED controller providing de-flicker function by hysteresis control. The present invention also relates to an LED de-flicker circuit, and an LED de-flicker method.

2. Description of Related Art

Figure 1:
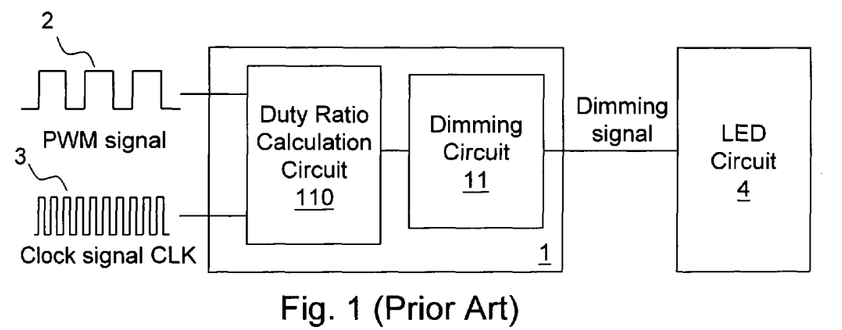
FIG. 1 shows a schematic diagram of a prior art LED controller 1 and relevant circuitry.
Figure 2:
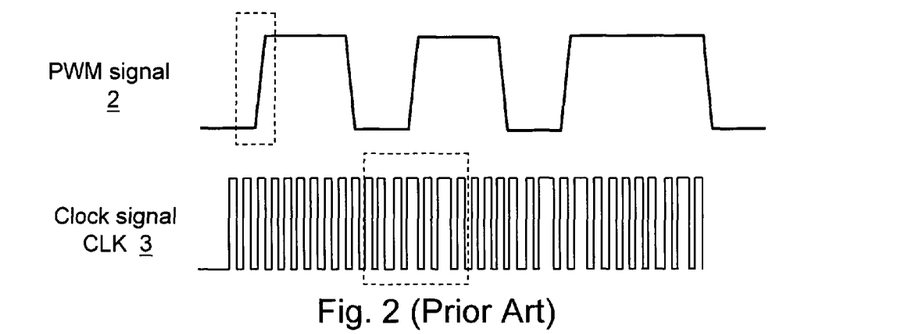
FIG. 2 shows the waveforms of a PWM signal with skew and a clock signal CLK with jitter.

FIG. 1 shows a schematic diagram of a prior art LED controller 1 for controlling an LED circuit 4 which has at least one LED. The brightness of the LED can be adjusted according to a duty ratio of a pulse width modulation (PWM) signal 2. The higher the duty ratio is, the brighter the LED is. In the circuit shown in FIG. 1, a duty ratio calculation circuit 110 counts the pulse width and the period of the PWM signal 2 by a high frequency clock signal CLK 3, to obtain the duty ratio (expressed by an n-bit digital signal). However, as shown in FIG. 2, the rising and falling edges of the PWM signal 2 often skew in an actual case, and the clock signal CLK 3 might jitter. Either condition can result in an error of the duty ratio calculation. Thus, although the PWM signal 2 remains unchanged, the duty ratio may change because of the error of the duty ratio calculation, and this may cause the LED to flicker.

In view of the foregoing, the present invention provides an LED controller with de-flicker function and an LED de-flicker circuit and an LED de-flicker method, to solve the above flicker problem.

SUMMARY OF THE INVENTION

A first objective of the present invention is to provide an LED controller with de-flicker function.

A second objective of the present invention is to provide an LED de-flicker circuit.

A third objective of the present invention is to provide an LED de-flicker method.

To achieve the objective mentioned above, from one perspective, the present invention provides an LED controller with de-flicker function, comprising: a duty ratio calculation circuit for receiving a pulse width modulation PWM signal and calculating its duty ratio to generate a duty input signal indicating the duty ratio of the PWM signal; an LED de-flicker circuit for receiving the duty input signal and generating a duty output signal in which a noise in the duty input signal is filtered; and a dimming circuit for receiving the duty output signal and generating a dimming signal for controlling an LED circuit; wherein when the variation of the duty input signal is not larger than a hysteresis threshold, the duty output signal remains unchanged; and when the variation of the duty input signal is larger than the hysteresis threshold, the duty output signal follows the duty input signal and then remains unchanged until next time when the variation of the duty input signal is larger than the hysteresis threshold.

In a preferred embodiment, the LED controller further includes a hysteresis threshold setting circuit for dynamically setting the hysteresis threshold. The hysteresis threshold setting circuit preferably includes a hysteresis determination circuit for determining the hysteresis threshold according to the period of the PWM signal or the duty input signal.

From another perspective, the present invention provides an LED de-flicker circuit for receiving a duty input signal and generating a duty output signal in which a noise in the duty input signal is filtered, the LED de-flicker comprises: a judgment circuit for receiving the duty input signal and determining whether the variation of the duty input signal is larger than the hysteresis threshold, and generating a judgment signal accordingly; and an output generation circuit controlled by the judgment signal, to output the duty input signal or to remain outputting the duty output signal unchanged; wherein when the variation of the duty input signal is not larger than a hysteresis threshold, the duty output signal remains unchanged; and when the variation of the duty input signal is larger than the hysteresis threshold, the duty output signal follows the duty input signal and then remains unchanged until next time when the variation of the duty input signal is larger than the hysteresis threshold.

In the aforementioned de-flicker circuit, the output generation circuit preferably includes a selecting circuit which is controlled by the judgment signal to select
(a) the duty input signal or
(b) (i) the duty output signal or (ii) a signal substantially equivalent to the duty output signal, wherein the signal substantially equivalent to the duty output signal is preferably obtained by storing the duty input signal in a latch circuit.

In another embodiment, the output generation circuit preferably includes a latch circuit which is controlled by the judgment signal to store the duty input signal, and the output of the latch circuit is the duty output signal.

In another embodiment, the output generation circuit preferably includes an up/down counter for counting up or down according to the comparison result of the aforementioned signals (a) and (b), and the output of the up/down counter is the duty output signal.

In the aforementioned de-flicker circuit, the judgment circuit includes: an absolute difference circuit for receiving the aforementioned signals (a) and (b), the absolute difference circuit generating an absolute difference signal according to the difference between (a) and (b); and a hysteresis threshold comparison circuit for comparing the absolute difference signal and the hysteresis threshold, and generating the judgment signal accordingly.

The aforementioned absolute difference circuit preferably includes: a number comparison circuit for comparing the aforementioned signals (a) and (b); a subtraction circuit having a first end for receiving a minuend and a second end for receiving a subtrahend, and the subtraction circuit outputting the absolute difference signal; and a selecting circuit determining which of (a) and (b) is inputted to the first end as the minuend, and the other signal is inputted to the second end as the subtrahend.

From another perspective, the present invention provides an LED de-flicker method, comprising: receiving a pulse width modulation PWM signal and calculating its duty ratio to generate a duty input signal indicating the duty ratio of the PWM signal; receiving the duty input signal and generating a duty output signal in which a noise in the duty input signal is filtered; and receiving the duty output signal and generating a dimming signal for controlling an LED circuit; wherein when the variation of the duty input signal is not larger than a hysteresis threshold, the duty output signal remains unchanged; and when the variation of the duty input signal is larger than the hysteresis threshold, the duty output signal follows the duty input signal and then remains unchanged until next time when the variation of the duty input signal is larger than the hysteresis threshold.

The objectives, technical details, features, and effects of the present invention will be better understood with regard to the detailed description of the embodiments below.

DESCRIPTION OF THE PREFERRED EMBODIMENTS

The spirit of the present invention is to provide an LED controller, an LED de-flicker circuit, and an LED de-flicker method, which use hysteresis judgment to solve the LED flicker problem.

Figure 3:
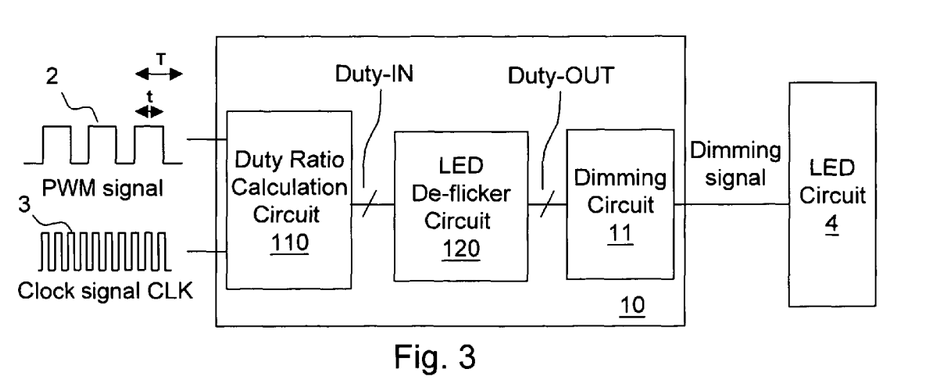
FIG. 3 shows an embodiment of the present invention.

FIG. 3 shows an LED controller with de-flicker function according to an embodiment of the present invention. As shown in the figure, a PWM signal 2 is inputted to a duty ratio calculation circuit 110 in an LED controller 10. The duty ratio calculation circuit 110 calculates the duty ratio of the PWM signal 2 by the clock signal CLK 3 shown in FIG. 2 (the clock signal CLK 3 can be generated internally or provided externally), and expresses the duty ratio by an n-bit digital signal, which is the duty input signal Duty-IN. For example, if the ON time of the PWM signal 2 is t and the period is T, the duty input signal Duty-IN=(t/T)*$2^n$.

The duty input signal Duty-IN is inputted to an LED de-flicker circuit 120. The LED de-flicker circuit 120 outputs a duty output signal Duty-OUT according to the duty input signal Duty-IN, wherein the duty output signal Duty-OUT is also an n-bit digital signal, and has a hysteresis relationship with the duty input signal Duty-IN. When the variation of the duty input signal Duty-IN is not larger than a hysteresis threshold HYS (not shown in FIG. 3, will be described in details later), the duty output signal Duty-OUT remains unchanged; and when the variation of the duty input signal Duty-IN is larger than the hysteresis threshold HYS, the duty output signal Duty-OUT follows the duty input signal Duty-IN and then remains unchanged until next time when the variation of the duty input signal Duty-IN is larger than the hysteresis threshold HYS. For example, let us assume that the hysteresis threshold HYS is 1, below shows how the signal Duty-OUT responds to the variation of the signal DUTY-IN:

| Time | Duty-IN | Baseline | variation | Duty-OUT |
|------|---------|----------|-----------|----------|
| T0 | 196 | 196 | n/a | 196 |
| T1 | 197 | 196 | 1 | 196 |
| T2 | 198 | 196 | 2 | 198 |
| T3 | 197 | 198 | 1 | 198 |
| T4 | 199 | 198 | 1 | 198 |
| T5 | 200 | 198 | 2 | 200 |
| T6 | 205 | 200 | 5 | 205 |

That is, only when the variation of the duty input signal Duty-IN is larger than the hysteresis threshold HYS, the duty output signal Duty-OUT follows the duty input signal Duty-IN (at T2, T5, and T6).

A dimming circuit 11 in the LED controller 10 receives the duty output signal Duty-OUT generated by the de-flicker circuit 120, and generates a dimming signal in a digital or analog form for adjusting the brightness of the LED circuit 4. If the dimming signal is a digital signal, it can be used to control the average conduction time of the LED circuit 4. If the dimming signal is an analog signal, it can be used to control the current through the LED circuit 4. Both approaches can adjust the brightness of the LED circuit 4.

Figure 4:
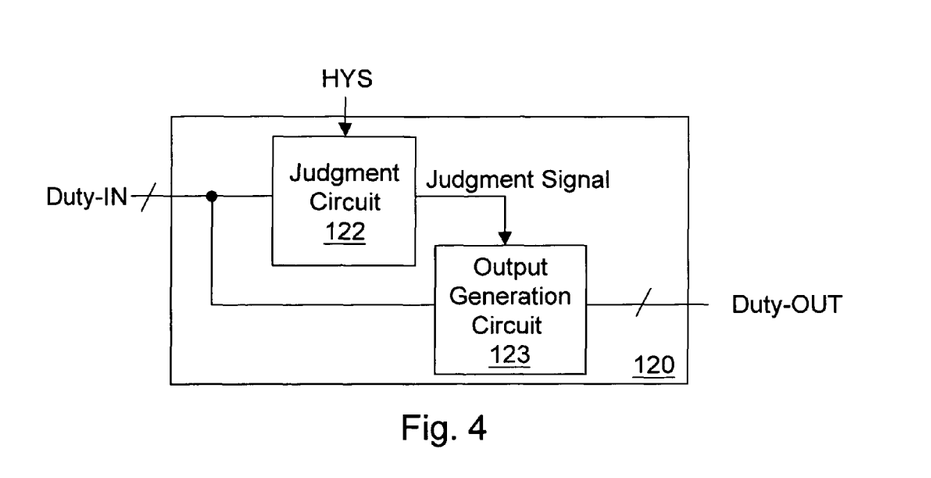
FIG. 4 shows the structure of the LED de-flicker circuit 120.

FIG. 4 shows the de-flicker circuit 120 which includes a judgment circuit 122 and an output generation circuit 123. The judgment circuit 122 receives the duty input signal Duty-IN and determines whether its variation is larger than the hysteresis threshold HYS. If the variation of the duty input signal Duty-IN is larger than the hysteresis threshold HYS, the judgment circuit will generate a judgment signal. The output generation circuit 123 is controlled by the judgment signal, that is, the judgment signal determines whether the output generation circuit 123 outputs the duty input signal Duty-IN, or remains outputting the present duty output signal Duty-OUT. The hysteresis threshold HYS may be a predetermined constant or a number that can be dynamically adjusted. The details of the judgment circuit 122 and how the hysteresis threshold HYS is dynamically adjusted will be described later.

Figure 5:
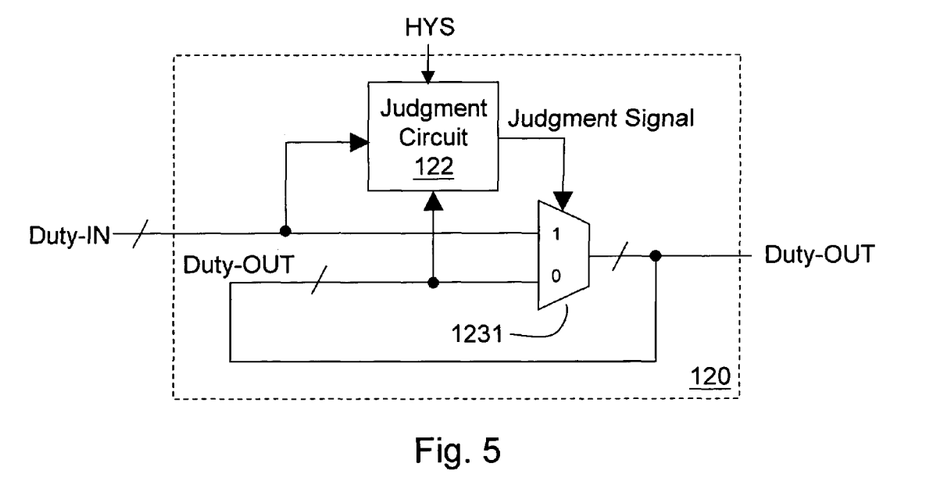
FIG. 5 shows an embodiment of the LED de-flicker circuit 120.

FIG. 5 shows an embodiment of the LED de-flicker circuit 120. The output generation circuit 123 in FIG. 4 is embodied by a selecting circuit 1231 which has a first input terminal for receiving the duty input signal Duty-IN, and a second input terminal for receiving the duty output signal Duty-OUT. The selecting circuit 1231 is controlled by the judgment signal to select its output. The judgment circuit 122 receives the duty input signal Duty-IN and the duty output signal Duty-OUT, and compares the difference of the duty input signal Duty-IN and the duty output signal Duty-OUT with the hysteresis threshold HYS to determine whether to output the judgment signal.

Figure 6:
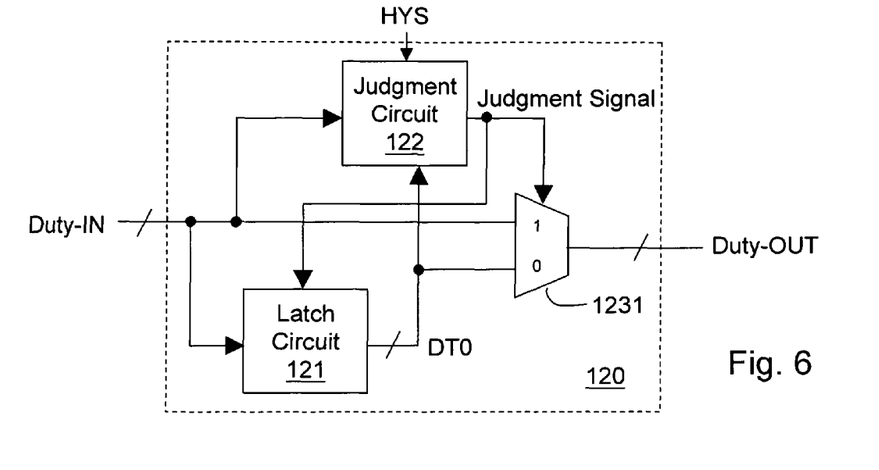
FIG. 6 shows another embodiment of the LED de-flicker circuit 120.

In the embodiment shown in FIG. 5, the purpose of feeding back the duty output signal Duty-OUT to the judgment circuit 122 (and the selecting circuit 1231) is to use the duty output signal Duty-OUT which is outputted at a previous time point as the baseline for calculating the variation. However, the baseline does not have to be the duty output signal Duty-OUT which is outputted at the previous time point. Referring to FIG. 6, the duty input signal Duty-IN can be stored in a latch circuit 121, and an output DT0 of the latch circuit 121 is used as the baseline which is inputted to the judgment circuit 122 and the selecting circuit 1231. The latch circuit 121 stores the duty input signal Duty-IN only when the latch circuit 121 is enabled by the judgment signal. In other words, the signal DT0 is substantially equivalent to the duty output signal Duty-OUT which is outputted at the previous time point.

Figure 7:
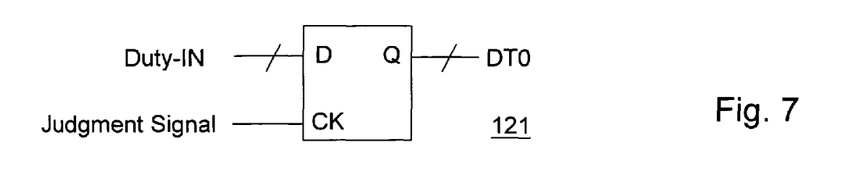
FIG. 7 shows an embodiment of the latch circuit 121.

In the embodiment shown in FIG. 6, the latch circuit 121 for example can be, but is not limited to, a D-type flip-flop. As shown in FIG. 7, the duty input signal Duty-IN is inputted to the data input of the D-type flip-flop, and the judgment signal is inputted to the clock input; the output signal of the D-type flip-flop is the signal DT0. When the clock input is triggered by the judgment signal, the D-type flip-flop stores the duty input signal Duty-IN.

Figure 8:
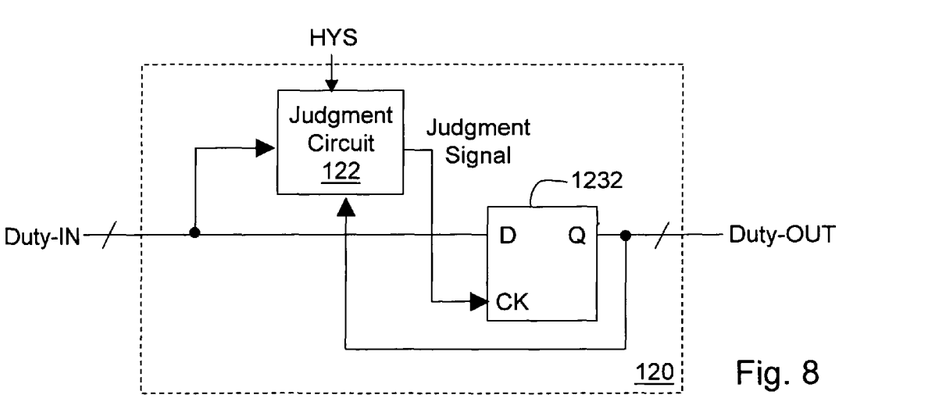
FIG. 8 shows another embodiment of the LED de-flicker circuit 120.

FIG. 8 shows another embodiment of the LED de-flicker circuit 120. The output generation circuit 123 shown in FIG. 4 is embodied by a latch circuit 1232 in this embodiment. The latch circuit 1232 for example can be, but is not limited to, a D-type flip-flop which stores the duty input signal Duty-IN when it is enabled by the judgment signal, and the output of the latch circuit 1232 is the duty output signal Duty-OUT. The structure and the connections of the latch circuit 1232 are similar to the latch circuit 121, but their functions are different. The latch circuit 121 is for storing the duty input signal Duty-IN as the baseline; the latch circuit 1232 is for selecting one of the current duty input signal Duty-IN and the previous duty output signal Duty-OUT as the output signal.

Figure 9:
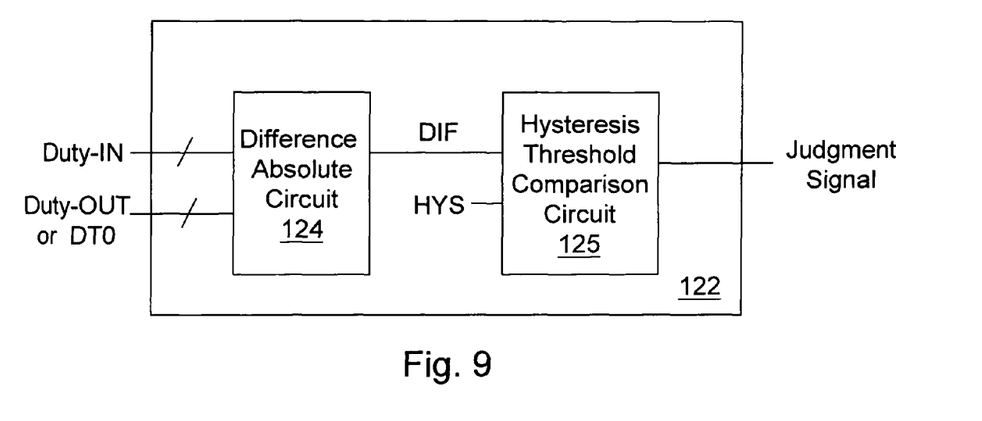
FIG. 9 shows a hardware embodiment of the judgment circuit 122.
Figure 10:
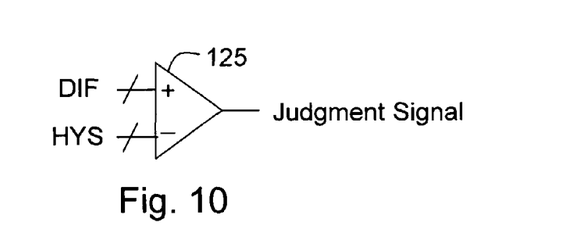
FIG. 10 shows an embodiment of the hysteresis threshold comparison circuit 125.

The judgment circuit 122 can be embodied by a processor with suitable software, or by hardware. FIG. 9 shows a hardware embodiment of the judgment circuit 122. The judgment circuit 122 of this embodiment includes an absolute difference circuit 124 and a comparison circuit 125. The absolute difference circuit 124 receives:

(a) the duty input signal Duty-IN, and
(b) (i) the duty output signal Duty-OUT or (ii) the signal DT0, which is substantially equivalent to the duty output signal Duty-OUT, and generates an absolute difference signal DIF according to the difference between (a) and (b). The hysteresis threshold comparison circuit 125 compares the absolute difference signal DIF with the hysteresis HYS, and generates the judgment signal according to the comparison result. The hysteresis threshold comparison circuit 125 for example can be, but is not limited to, the comparator 125 shown in FIG. 10 (the comparator 125 may be a hysteresis comparator or a normal comparator).

Figure 11:
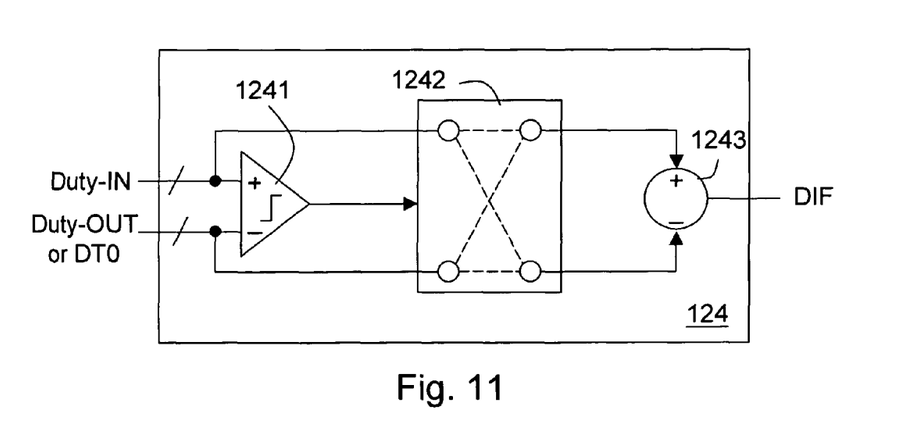
FIG. 11 shows a hardware embodiment of the absolute difference circuit 124.

FIG. 11 shows a hardware embodiment of the absolute difference circuit 124. The absolute difference circuit 124 of this embodiment includes a comparator 1241 (the comparator 1241 may be a hysteresis comparator or a general comparator), a selecting circuit 1242, and a subtraction circuit 1243. The comparator 1241 compares the aforementioned signals (a) and (b), and depending on the comparison result, the selecting circuit 1242 determines which of (a) and (b) is inputted to the positive end of the subtraction circuit 1243 as the minuend, and the other signal is inputted to the negative end of the subtraction circuit 1243 as the subtrahend. The output of the subtraction circuit 1243 is the absolute difference signal DIF.

Figure 12:
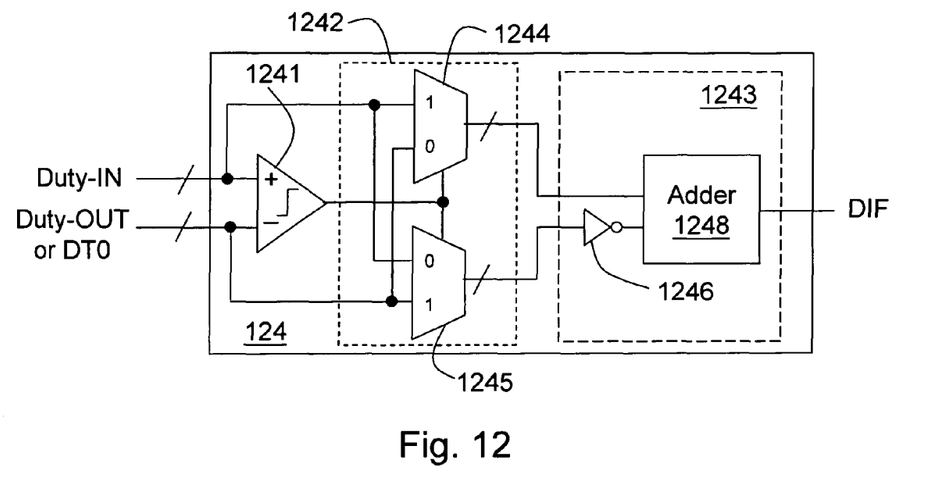
FIG. 12 shows an embodiment of the absolute difference circuit 124 with more hardware details.

FIG. 12 shows a more specific embodiment of the absolute difference circuit 124. As shown in FIG. 12, the selecting circuit 1242 includes a first selector 1244 and a second selector 1245. When the duty input signal Duty-IN is larger than the duty output signal Duty-OUT, the output of the comparator 1241 controls the first selector 1244 to select the duty input signal Duty-IN and the second selector 1245 to select the duty output signal Duty-OUT, as their output signals. On the contrary, when the duty input signal Duty-IN is smaller than the duty output signal Duty-OUT, the output of the comparator 1241 controls the first selector 1244 to select the duty output signal Duty-OUT and the second selector 1245 to select the duty input signal Duty-IN, as their output signals. The subtraction circuit 1243 includes an inverter 1246 and an adder 1248. The output signal of the second selector 1245 is inputted to the inverter 1246, and the output of the inverter 1246 is added with the output signal of the first selector 1244 by the adder 1248; thus, the absolute difference signal DIF, which is the absolute difference of the duty input signal Duty-IN and the duty output signal Duty-OUT, will be generated.

Figure 13:
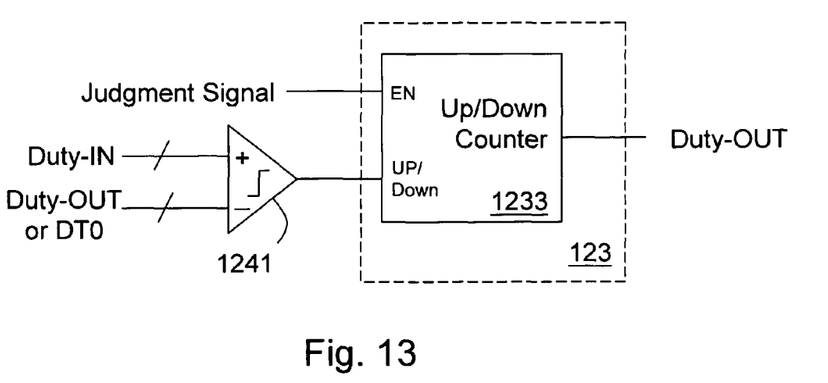
FIG. 13 shows another embodiment of the output generation circuit 123.

FIG. 13 shows another embodiment of the output generation circuit 123. The output generation circuit shown in FIG. 4 is embodied by an up/down counter 1233. The up/down counter 1233 is enabled by the judgment signal, and counts up or down according to the output of the comparator 1241; the output of the up/down counter 1233 is the duty output signal Duty-OUT. In this embodiment, when the duty input signal Duty-IN suddenly changes a vast amount, the duty output signal Duty-OUT does not respond immediately; instead, it changes gradually such that the brightness of the LED circuit 4 will not change drastically. Below shows an example as to how the signal Duty-OUT responds to the variation of the signal DUTY-IN in this embodiment:

| Time | Duty-IN | Baseline | variation | Duty-OUT |
|------|---------|----------|-----------|----------|
| T0   | 196     | 196      | n/a       | 196      |
| T1   | 205     | 196      | 9         | 197      |
| T2   | 205     | 197      | 8         | 198      |
| T3   | 205     | 198      | 7         | 199      |
| T4   | 205     | 199      | 6         | 200      |
| T5   | 205     | 200      | 5         | 201      |
| T6   | 205     | 201      | 4         | 202      |
| T7   | 205     | 202      | 3         | 203      |
| T8   | 205     | 203      | 2         | 204      |
| T9   | 205     | 204      | 1         | 204      | wherein the up/down counter 1233 can operate under a clock signal which is the same as or different from a clock signal of the other part of the circuitry. If the up/down counter 1233 operates under a different clock signal, in the above table, the variation of the duty output signal Duty-OUT in each unit time may be more than 1.

Figure 14:
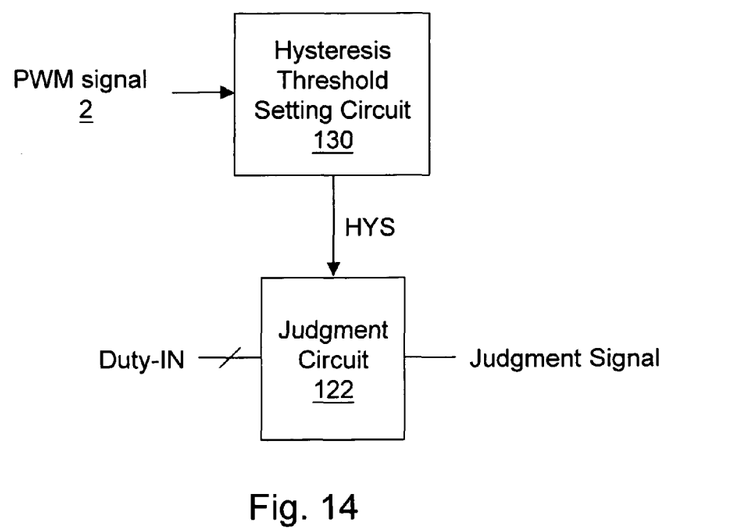
FIGS. 14 and 15 show that the hysteresis threshold HYS can be dynamically adjusted by the hysteresis threshold setting circuit 130.
Figure 15:
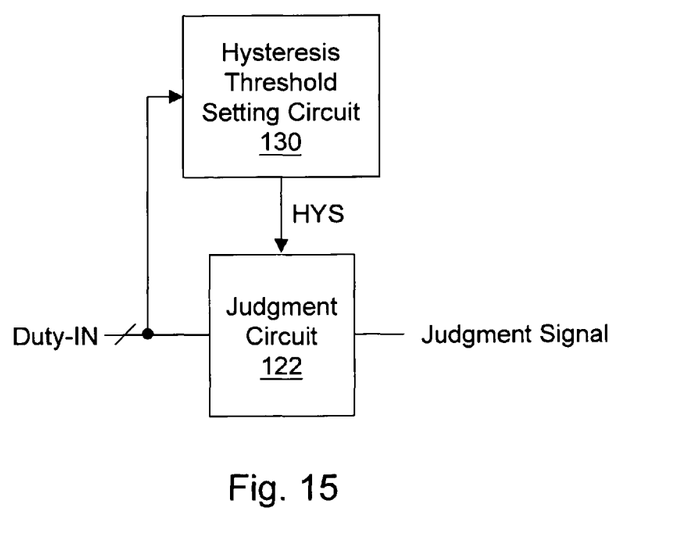

According to the present invention, the hysteresis threshold HYS may be a predetermined constant or a number that can be dynamically adjusted. In the latter condition, the hysteresis threshold HYS for example can be set manually from outside of the LED controller 10, or as shown in FIGS. 14 and 15, the hysteresis threshold HYS can be determined by a hysteresis threshold setting circuit 130, according to the period of the PWM signal 2 or according to the duty input signal Duty-IN. More specifically, one of the reasons why the hysteresis threshold HYS needs to be adjusted dynamically could be: when the period of the PWM signal 2 is longer, the impact of the PWM signal 2 skew and the clock signal CLK 3 jitter is relatively lower; and when the period of the PWM signal 2 is shorter, the impact is relatively higher. Therefore, the hysteresis threshold HYS may need to be determined according to the period of the PWM signal 2, for example, to assign a higher hysteresis threshold HYS when the period of the PWM signal 2 is shorter. Another reason to adjust the hysteresis threshold HYS could be that the human eye has a relatively lower sensitivity in some brightness range, and therefore the hysteresis threshold HYS can be determined according to the range in which the duty input signal Duty-IN is. For example, the hysteresis threshold HYS is assigned a higher value in a brightness range where the human eye is more sensitive.

Figure 16:
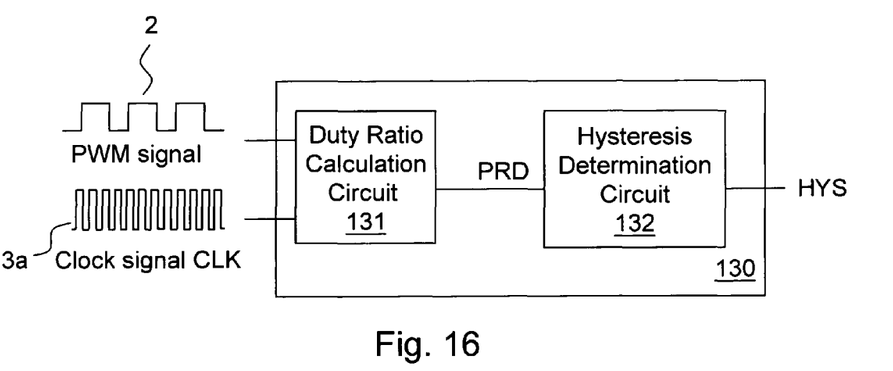
FIG. 16 shows an embodiment of the hysteresis threshold setting circuit 130.

FIG. 16 shows an embodiment of the hysteresis threshold setting circuit 130 which includes a duty ratio calculation circuit 131 and a hysteresis determination circuit 132. The duty ratio calculation circuit 131 receives the PWM signal 2, and counts the period of the PWM signal 2 by a clock signal CLK 3a to generate a period signal PRD, wherein the clock signal CLK 3a can be generated internally or provided externally. The clock signal CLK 3a may be the same as or different from the clock signal CLK 3. The hysteresis determination circuit 132 receives the period signal PRD, and determines the hysteresis threshold HYS according to the period signal PRD. For example, assuming that the duty ON time is t, and the period is T,
the duty input signal Duty-IN=(t/T)*2'.

And assuming that when the duty input signal Duty-IN is counted by the clock signal CLK 3a, the pulse number of the period T is M, then for example, the hysteresis threshold HYS can be set as:
when $M>2^{n+1}$, HYS=1,
when $2^n<M\leq2^{n+1}$, HYS=2,
when $2^{n-1}<M\leq2^n$, HYS=4, etc.

If the hysteresis threshold setting circuit 130 determines the hysteresis threshold HYS according to the duty input signal Duty-IN, the hysteresis threshold setting circuit 130 does not need to include the period calculation circuit 131, and it only needs to include the hysteresis determination circuit 132.

Figure 17:
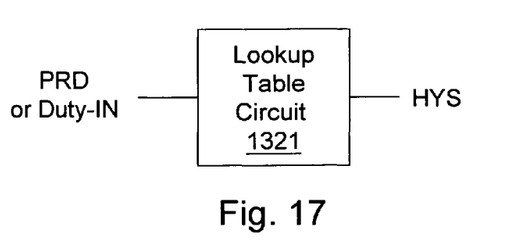
FIGS. 17, 18 and 19 show several embodiments of the hysteresis determination circuit.
Figure 18:
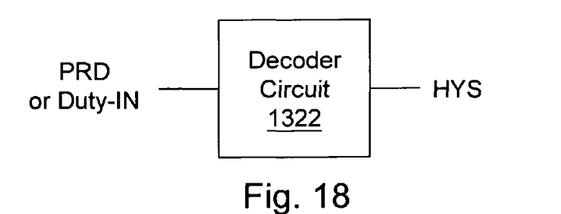
Figure 19:
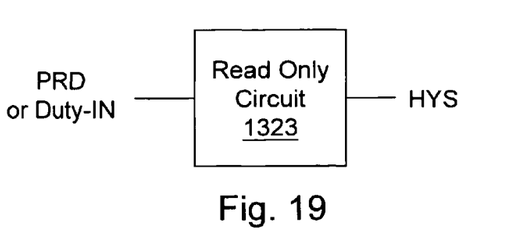

The hysteresis determination circuit 132 for example may be a lookup table circuit 1321, a decoder circuit 1322, or a read only circuit 1323 as shown in FIGS. 17-19. In the lookup table circuit 1321 and the decoder circuit 1322, the relationships between corresponding input and output signals can be predetermined. In the read only circuit 1323, the period signal PRD or the duty input signal Duty-IN (or their most significant bit(s)) can be used as an address for obtaining a corresponding hysteresis threshold HYS. In addition to the above, the hysteresis determination circuit 132 may be any other circuit which can determine the hysteresis threshold HYS according to an input.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the meaning of a signal indicated by a rising edge and high level may be replaced by a falling edge and a low level, with corresponding amendment of the circuit. For another example, the up/down count by a counter may be arranged reversely. The hysteresis threshold may be more than one number. For another example, a device which does not substantially influence the primary function of a signal can be inserted between any two devices in the shown embodiments, such as a switch or the like. For another example, the positive and negative input terminals of the comparators are interchangeable, with corresponding amendment of the circuits processing these signals. In view of the foregoing, the spirit of the present invention should cover all such and other modifications and variations, which should be interpreted to fall within the scope of the following claims and their equivalents.

What is claimed is:

1. An LED controller with de-flicker function, comprising:
  a duty ratio calculation circuit for receiving a pulse width modulation (PWM) signal and calculating its duty ratio to generate a duty input signal indicating the duty ratio of the PWM signal;
  an LED de-flicker circuit for receiving the duty input signal and generating a duty output signal in which a noise in the duty input signal is filtered; and
  a dimming circuit for receiving the duty output signal and generating a dimming signal for controlling an LED circuit;
  wherein when the variation of the duty input signal is not larger than a hysteresis threshold, the duty output signal remains unchanged; and
  when the variation of the duty input signal is larger than the hysteresis threshold, the duty output signal follows the duty input signal and then remains unchanged until next time when the variation of the duty input signal is larger than the hysteresis threshold.

2. The LED controller of claim 1, wherein the LED de-flicker circuit includes:
  a judgment circuit for receiving the duty input signal and determining whether the variation of the duty input signal is larger than the hysteresis threshold, and generating a judgment signal accordingly; and
  an output generation circuit controlled by the judgment signal, to output the duty input signal or to remain outputting the duty output signal unchanged.

3. The LED controller of claim 2, wherein the output generation circuit includes a selecting circuit which has a first input terminal for receiving the duty input signal, and a second input terminal for receiving (a) the duty output signal or (b) a signal substantially equivalent to the duty output signal, and the selecting circuit is controlled by the judgment signal to determine its output.

4. The LED controller of claim 3, wherein the LED de-flicker circuit further includes: a latch circuit enabled by the judgment signal to store the duty input signal, the latch circuit having an output terminal which is coupled to the second input terminal of the selecting circuit.

5. The LED controller of claim 2, wherein the output generation circuit includes a latch circuit enabled by the judgment signal to store the duty input signal, the output of the latch circuit being provided as the duty output signal.

6. The LED controller of claim 2, wherein the judgment circuit includes:
  an absolute difference circuit for receiving (a) the duty input signal, and (b) (i) the duty output signal or (ii) a signal substantially equivalent to the duty output signal, the absolute difference circuit generating an absolute difference signal according to the difference between (a) and (b); and
  a hysteresis threshold comparison circuit for comparing the absolute difference signal and the hysteresis threshold, and generating the judgment signal accordingly.

7. The LED controller of claim 6, wherein the absolute difference circuit includes:
  a number comparison circuit for comparing (a) the duty input signal and (b) (i) the duty output signal or (ii) a signal substantially equivalent to the duty output signal;
  a subtraction circuit having a first end for receiving a minuend and a second end for receiving a subtrahend, the subtraction circuit outputting the absolute difference signal; and
  a selecting circuit determining which of:
    (a) the duty input signal, and
    (b) (i) the duty output signal or (ii) the signal substantially equivalent to the duty output signal is inputted to the first end as the minuend, and the other signal is inputted to the second end as the subtrahend.

8. The LED controller of claim 7, wherein the output generation circuit includes an up/down counter enabled by the judgment signal to count up or down according to the comparison result of the number comparison circuit, the output of the up/down counter being provided as the duty output signal.

9. The LED controller of claim 1, further including a hysteresis threshold setting circuit for dynamically setting the hysteresis threshold.

10. The LED controller of claim 9, wherein the hysteresis threshold setting circuit includes:
 a period calculation circuit for receiving the PWM signal and calculating its duty ratio to generate a period signal related to the period of the PWM signal; and
 a hysteresis determination circuit for determining the hysteresis threshold according to the period signal.

11. The LED controller of claim 10, wherein the hysteresis determination circuit is a lookup table circuit, a decoder circuit, or a read only circuit.

12. The LED controller of claim 9, wherein the hysteresis threshold setting circuit receives the duty input signal, and the hysteresis threshold setting circuit includes a hysteresis determination circuit for determining the hysteresis threshold according to the duty input signal.

13. The LED controller of claim 12, wherein the hysteresis determination circuit is a lookup table circuit, a decoding circuit, or a read only circuit.

14. An LED de-flicker circuit for receiving a duty input signal and generating a duty output signal in which a noise in the duty input signal is filtered, the LED de-flicker comprising:
 a judgment circuit for receiving the duty input signal and determining whether the variation of the duty input signal is larger than the hysteresis threshold, and generating a judgment signal accordingly; and
 an output generation circuit controlled by the judgment signal, to output the duty input signal or to remain outputting the duty output signal unchanged;
 wherein when the variation of the duty input signal is not larger than a hysteresis threshold, the duty output signal remains unchanged; and when the variation of the duty input signal is larger than the hysteresis threshold, the duty output signal follows the duty input signal and then remains unchanged until next time when the variation of the duty input signal is larger than the hysteresis threshold.

15. The LED de-flicker circuit of claim 14, wherein the output generation circuit includes a selecting circuit which has a first input terminal for receiving the duty input signal, and a second input terminal for receiving (a) the duty output signal or (b) a signal substantially equivalent to the duty output signal, and the selecting circuit is controlled by the judgment signal to determine its output.

16. The LED de-flicker circuit of claim 15 further including: a latch circuit enabled by the judgment signal to store the duty input signal, the latch circuit having an output terminal which is coupled to the second input terminal of the selecting circuit.

17. The LED de-flicker circuit of claim 14, wherein the output generation circuit includes a latch circuit enabled by the judgment signal to store the duty input signal, the output of the latch circuit being provided as the duty output signal.

18. The LED de-flicker circuit of claim 14, wherein the judgment circuit includes:
 an absolute difference circuit for receiving (a) the duty input signal, and (b) (i) the duty output signal or (ii) a signal substantially equivalent to the duty output signal, the absolute difference circuit generating an absolute difference signal according to the difference between (a) and (b); and
 a hysteresis threshold comparison circuit for comparing the absolute difference signal and the hysteresis threshold, and generating the judgment signal accordingly.

19. The LED de-flicker circuit of claim 18, wherein the absolute difference circuit includes:
 a number comparison circuit for comparing (a) the duty input signal and (b) (i) the duty output signal or (ii) a signal substantially equivalent to the duty output signal;
 a subtraction circuit having a first end for receiving a minuend and a second end for receiving a subtrahend, and the subtraction circuit outputting the absolute difference signal; and
 a selecting circuit determining which of:
  (a) the duty input signal, and
  (b) (i) the duty output signal or (ii) the signal substantially equivalent to the duty output signal is inputted to the first end as the minuend, and the other signal is inputted to the second end as the subtrahend.

20. The LED de-flicker circuit of claim 18, wherein the output generation circuit includes an up/down counter enabled by the judgment signal to count up or down according to the comparison result of the number comparison circuit, the output of the up/down counter being provided as the duty output signal.

21. The LED de-flicker circuit of claim 14 further including a hysteresis threshold setting circuit for dynamically setting the hysteresis threshold.

22. The LED de-flicker circuit of claim 21, wherein the hysteresis threshold setting circuit includes:
 a period calculation circuit for receiving the PWM signal and calculating its duty ratio to generate a period signal related to the period of the PWM signal; and
 a hysteresis determination circuit for determining the hysteresis threshold according to the period signal.

23. The LED de-flicker circuit of claim 22, wherein the hysteresis determination circuit is a lookup table circuit, a decoder circuit, or a read only circuit.

24. The LED de-flicker circuit of claim 21, wherein the hysteresis threshold setting circuit receives the duty input signal, and the hysteresis threshold setting circuit includes a hysteresis determination circuit for determining the hysteresis threshold according to the duty input signal.

25. The LED de-flicker circuit of claim 24, wherein the hysteresis determination circuit is a lookup table circuit, a decoding circuit, or a read only circuit.

26. An LED de-flicker method, comprising:
 receiving a pulse width modulation (PWM) signal and calculating its duty ratio to generate a duty input signal indicating the duty ratio of the PWM signal;
 receiving the duty input signal and generating a duty output signal in which a noise in the duty input signal is filtered; and
 receiving the duty output signal and generating a dimming signal for controlling an LED circuit;
 wherein when the variation of the duty input signal is not larger than a hysteresis threshold, the duty output signal remains unchanged; and
 when the variation of the duty input signal is larger than the hysteresis threshold, the duty output signal follows the duty input signal and then remains unchanged until next time when the variation of the duty input signal is larger than the hysteresis threshold.

27. The LED de-flicker method of claim 26, wherein the step of receiving the duty input signal and generating a duty output signal further includes: storing the duty input signal.

28. The LED de-flicker method of claim 26, wherein the step of receiving the duty input signal and generating a duty output signal includes:
  receiving the duty input signal and determining whether the variation of the duty input signal is larger than the hysteresis threshold, and generating a judgment signal accordingly; and
  determining to output the duty input signal or to remain outputting the present duty output signal unchanged according to the judgment signal.

29. The LED de-flicker method of claim 28, wherein the step of receiving the duty input signal and determining whether the variation of the duty input signal is larger than the hysteresis threshold includes:
  receiving (a) the duty input signal, and (b) (i) the duty output signal or (ii) a signal substantially equivalent to the duty output signal, and generating an absolute difference signal according to the difference between (a) and (b); and
  comparing the absolute difference signal and the hysteresis threshold, and generating the judgment signal accordingly.

30. The LED de-flicker method of claim 29, wherein the step of generating an absolute difference signal includes:
  comparing (a) the duty input signal and (b) (i) the duty output signal or (ii) a signal substantially equivalent to the duty output signal to generate a number comparison signal; and
  determining which of (a) the duty input signal and (b) (i) the duty output signal or (ii) the signal substantially equivalent to the duty output signal is a minuend, and which is a subtrahend, according to the number comparison signal.

31. The LED de-flicker method of claim 30, further comprising: providing an up/down counter counting up or down according to the number comparison signal, the output of the up/down counter being provided as the duty output signal.

32. The LED de-flicker method of claim 26, further comprising: dynamically setting the hysteresis threshold.

33. The LED de-flicker method of claim 32, wherein the step of dynamically setting the hysteresis threshold includes: setting the hysteresis threshold according to a period of the PWM signal, or according to the duty input signal.

* * * * *